(No Model.)

L. ABBOTT.
VALVE OR COCK FOR LIQUID RECEPTACLES.

No. 330,766. Patented Nov. 17, 1885.

Witnesses.
A. L. White
H. Brown

Inventor
Levi Abbott
by Wright & Brown
Attys.

UNITED STATES PATENT OFFICE.

LEVI ABBOTT, OF BOSTON, MASSACHUSETTS, ASSIGNOR OF ONE-HALF TO GEORGE C. BARNEY, OF SAME PLACE.

VALVE OR COCK FOR LIQUID-RECEPTACLES.

SPECIFICATION forming part of Letters Patent No. 330,766, dated November 17, 1885.

Application filed February 11, 1885. Serial No. 155,607. (No model.)

*To all whom it may concern:*

Be it known that I, LEVI ABBOTT, of Boston, (Cambridge,) in the county of Middlesex and State of Massachusetts, have invented certain Improvements in Valves or Cocks for Liquid-Receptacles, of which the following is a specification.

This invention has for its object to provide an improved valve or cock which may be readily opened to permit the escape of liquid from a receptacle to which the valve is attached, and is closed automatically.

The invention consists in a valve or cock composed of a discharge tube or nozzle, of rubber or other flexible material, spring-actuated jaws or compressing devices which normally bear against said tube at opposite sides thereof and flatten the same so as to close it, and means, hereinafter specified, for separating said jaws, and thus releasing the tube when liquid is to be allowed to flow, as I will now proceed to describe.

Figure 1:
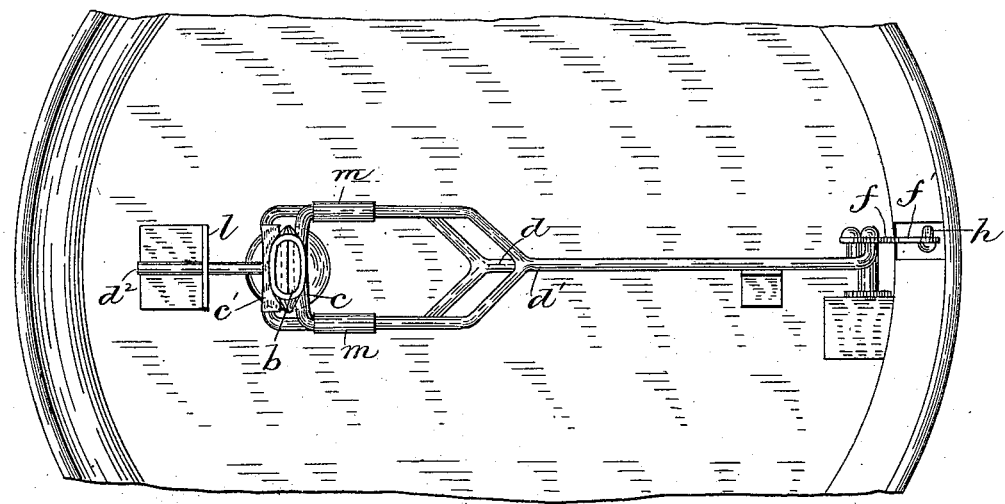
Figure 2:
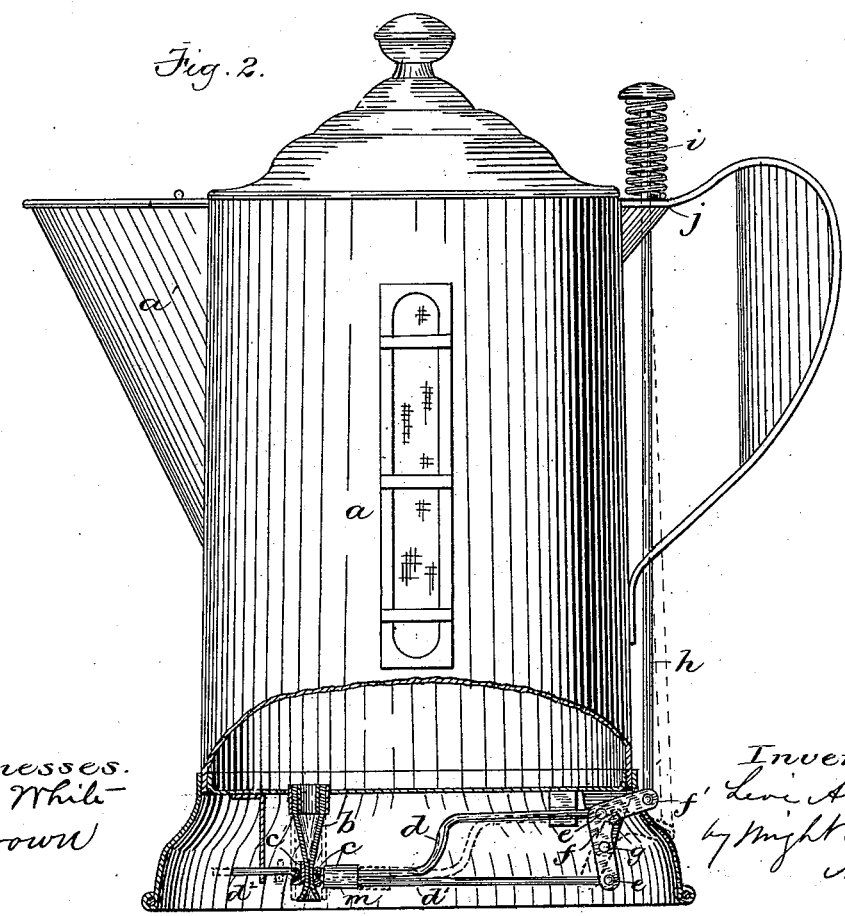

Of the accompanying drawings, forming a part of this specification, Figure 1 represents a bottom view of a receptacle having my improved valve. Fig. 2 represents a partial side elevation and partial vertical section of the same.

The same letters of reference indicate the same parts in all the figures.

In the drawings, $a$ represents a vessel or receptacle—such, for example, as is used to contain ale or beer.

$b$ represents a tube or nozzle, of rubber or other suitable material, inserted in the bottom of the vessel and constituting an outlet therefor.

$c\ c'$ represent movable jaws at opposite sides of the tube $b$. Said jaws are formed on branched arms $d\ d'$, which are pivoted at $e\ e$ to a lever, $f$, which in turn is pivoted at $g$ to an ear affixed to the receptacle, and has an arm, $f'$, with the outer end of which is engaged an operating rod or handle, $h$. A spring, $i$, is interposed between the upper end of the rod $h$ and a fixed bearing, $j$, through which the rod passes, (here shown as the handle of the vessel,) and normally presses the rod upwardly, and holds the lever $f$, arms $d\ d'$, and jaws $c\ c'$ in the positions shown in full lines in the drawings, the jaws being thus pressed against the tube $b$, and caused to flatten the same, so that no liquid could pass through it.

When the rod $h$ is depressed, it turns the lever $f$ on its pivot, as shown in dotted lines in Fig. 2, and thus separates the jaws $c\ c'$, and allows the tube $b$ to be expanded by its own elasticity and by the pressure of the liquid in it, so that the liquid can flow freely from the vessel. On the removal of pressure from the rod $h$ the spring $i$ raises the rod and causes the jaws to again grasp and flatten the tube $b$.

The lower arm, $d'$, is preferably provided with a projecting finger, $d^2$, which slides in a guiding-orifice in an ear, $l$, affixed to the vessel $a$. The arm $d$ has loops $m\ m$, which encircle the branches of the arm $d'$, and prevent either arm from moving laterally.

My improved cock or valve may be used for liquid-receptacles of various kinds, but is particularly useful in ale or beer pitchers, as a means for drawing the liquid from the bottom of the pitcher without the froth or foam, which accumulates at the top, so that by depressing the rod $h$ the liquid may be drawn in what is known as a "solid" condition, the pitcher being also capable of delivering the liquid from its spout $a'$ in the ordinary way when the bottom valve is not used.

I am aware that a flexible outlet-pipe for a sink has been provided with jaws or pressure devices, whereby it may be flattened to obstruct or close its passage; hence I do not claim, broadly, a valve or cock composed of a flexible tube and jaws arranged to grasp and flatten the same.

I claim—

The combination, with a vessel or receptacle, of the flexible nozzle or discharge-tube in the lower portion of the vessel, the jaws $c\ c'$, bearing on opposite sides of said tube, the arms $d\ d'$, to which said jaws are affixed, the lever $f$, pivoted to a fixed support and to the arms $d\ d'$, the rod or handle $h$, connected to an arm on said lever, and the spring $i$, whereby said rod, lever, arms, and jaws are normally held in position to cause the jaws to compress the tube, as set forth.

In testimony whereof I have signed my name to this specification, in the presence of two subscribing witnesses, this 3d day of February, 1885.

LEVI ABBOTT.

Witnesses:
C. F. BROWN,
A. L. WHITE.